United States Patent [19]

Lawson

[11] Patent Number: 5,230,213
[45] Date of Patent: Jul. 27, 1993

[54] AIRCRAFT TURBINE ENGINE THRUST REVERSER

[75] Inventor: Dale W. R. Lawson, Bonita, Calif.

[73] Assignee: Rohr, Inc., Chula Vista, Calif.

[21] Appl. No.: 713,515

[22] Filed: Jun. 12, 1991

[51] Int. Cl.⁵ ............................................... F02K 3/02
[52] U.S. Cl. .................................... 60/226.2; 60/230; 224/110 B
[58] Field of Search ............................ 60/226.27, 230; 244/110 B

[56] References Cited

U.S. PATENT DOCUMENTS

| 3,605,411 | 9/1971 | Maison et al. | 60/226.2 |
| 4,485,970 | 12/1984 | Fournier et al. | 244/110 B |
| 4,894,985 | 1/1990 | Dubois et al. | 60/226.2 |
| 4,960,243 | 10/1990 | Dubois et al. | 244/110 B |
| 5,003,770 | 4/1991 | Schegerin et al. | 60/226.2 |

FOREIGN PATENT DOCUMENTS 1324870  7/1973  United Kingdom ............... 60/230

Primary Examiner—Richard A. Bertsch
Assistant Examiner—Howard R. Richman
Attorney, Agent, or Firm—P. J. Schlesinger; Frank Gilliam

[57] ABSTRACT

A thrust reverser for use with turbo-fan aircraftt engines; in particular engines mounted on an aircraft fuselage. Four radially spaced openings around the engine each is closed by a stowed door. An actuator is provided to move each door to a deployed position extending through the opening, near the aft end of the opening. The aft end of each door extends into the tailpipe and directs air flow out through the opening, where the forward end of the door further directs the flow in an outwardly and forwardly direction. Doors adjacent to the aircraft fuselage are shaped to guide reverse airflow away from direct impingement on the fuselage. Deployable strakes are mounted on doors adjacent to the fuselage. The strakes are typically spring biased toward a stowed position flat against the inside of the door and are moved to a deployed position by aerodynamic forces when the doors are deployed. In the deployed position, they are located so as to deflect air flow away from the fuselage or other structures.

18 Claims, 7 Drawing Sheets

AIRCRAFT TURBINE ENGINE THRUST REVERSER

BACKGROUND OF THE INVENTION

This invention relates in general to pivot door type thrust reversers for aircraft turbine engines and, more particularly, to such a reverser adapted to partially block and reverse flow in the tailpipe of an aircraft turbine engine of the turbo-fan type.

Modern aircraft fan jet engines have a nacelle or shroud surrounding the engine, spaced outwardly from the core engine cowl to define an annular passage or duct for flow of air rearwardly from the outer portion of an enlarged axial flow compressor. In this type of engine, a large proportion of the total thrust is developed by the reaction to the air driven rearward by the fan and the balance results from ejection of the exhaust gas stream from the engine.

Aircraft using gas turbine engines tend to have high landing speeds, placing great stress on wheel braking systems and requiring very long runways. To reduce this braking requirement and permit use of shorter runways, means are now provided in such engines for reversing a major portion of engine thrust during the landing roll. Many different types of thrust reversers have been designed, of varying effectiveness.

With fan-jet engines, it is possible to block and reverse substantially all of the fan flow without excessive stress on the system, since a large part of the flow, core flow, continues through the engine. In some cases, sufficient reverse flow can be obtained by blocking only a substantial portion of the fan flow.

One type of thrust reverser often used in non-fan type turbine engines, uses a pair of large sturdy clam-shell like blocker doors which swing directly behind the jet exit nozzle and diverge forwardly to reverse thrust. This system must be very heavy and strong. Very complex and sturdy actuators are required for this system, which also tends to undesirably direct some of the reverse flow against aircraft structures.

Another type of thrust reverser uses cascade sets in the sidewalls of the engine nacelle with devices for uncovering the cascades to direct air flow through the cascades, which turn the airflow in a forwardly direction. Typical cascade type reversers include those disclosed by Montgomery in U.S. Pat. No. 4,145,877 and Hom et al in U.S. Pat. No. 3,500,646. While effective in fan-jet engines, these systems are mechanically complex, requiring a great many cooperating components.

Still another design uses pivotable doors lying in opening in the sidewall of the shroud or nacelle which pivot outwardly while a second set of doors pivot inwardly to block flow of air through the duct and direct it to the outwardly extending doors which direct air flow rearwardly. Typical of these is the system disclosed by Ellis in U.S. Pat. No. 3,612,401. These systems, while useable in fan-jet engines, tend to be heavy and mechanically complex.

Yet another design uses a plurality of pivotable doors located in openings arranged radially around the shroud. Each door pivots so that one end contacts the engine cowl blocking air flow through the annular duct while the other end extends outside the nacelle in a direction directing airflow forwardly. Typical of these are systems disclosed by Maison et al in U.S. Pat. No. 3,605,411 and Fournier et al in U.S. Pat. No. 4,485,970. These thrust reversers tend to have greater mechanical simplicity than other systems. Where the engines are mounted on the aircraft fuselage, these systems provide little control of the direction of reverse air flow, however, which often impinges on the aircraft fuselage and other structures.

Thus, there is a continuing need for improved thrust reversing systems for use in aircraft turbine engines which combine highly effective flow reversal and flow pattern control with low cost, light weight, mechanical simplicity and ease of maintenance.

SUMMARY OF THE INVENTION

The above problems, and others, are overcome in accordance with this invention by a thrust reverser system for use in aircraft turbine engines which includes a plurality of blocker doors stowed in radially located openings in the engine shroud wall during normal flight and which are simply rotatable by extensible actuators to deployed position in which the forward edge of each door extends outwardly and forwardly of the aft opening edge and the aft door edge extends partially into engine gas flow, typically blocking and reversing from about 50 to 80% of the flow through the engine. Reverse thrust is typically from about 25 to 35% of engine static thrust.

The shape and/or location of the doors which are adjacent to the aircraft fuselage can be tailored to reduce airflow impingement on the fuselage and other structures during reverse thrust operation. Typically, the shape and height of door end plates and side plates can be selected to tailor air flow. Also, automatically deployable strakes can be positioned on the inner walls of selected doors. Any suitable strake deployment mechanism may be used. For example, conventional hydraulic cylinders or the like could be used. However, for simplicity and light weight an automatic system using spring and aerodynamic forces is preferred. In that embodiment, each of the strakes is spring biased toward a stowed position lying against the inner door wall. When the door is deployed, aerodynamic forces resulting from the reverse air flow over the inner surface of the door causes the strake to move to a deployed position in which the strake guides air flow away from the aircraft fuselage and other structures. I have found that with the strake stowed with a small space between strake and inner door wall, sufficient air flow will occur to catch and move the edge of the strake.

In one embodiment, four substantially equally spaced doors are provided, with a space between two adjacent doors oriented toward the fuselage to reduce, in cooperation with the strakes, air flow impingement on the fuselage during reverse thrust operations. In a second embodiment, three substantially equally spaced doors are provided, with the space between two adjacent doors oriented toward the fuselage. In a third embodiment, three doors and one blocker only door are provided. The blocker only door is oriented toward the aircraft fuselage.

This thrust reverser is mechanically simple and allows convenient tailoring of reverse flow to avoid impingement on nearby structures, such as the fuselage where engines are mounted on the aircraft aft fuselage.

BRIEF DESCRIPTION OF THE DRAWING

Details of the engine and a preferred embodiment thereof will be further understood upon reference to the drawing, wherein.

DETAILED DESCRIPTION OF PREFERRED EMBODIMENTS

Figure 1:
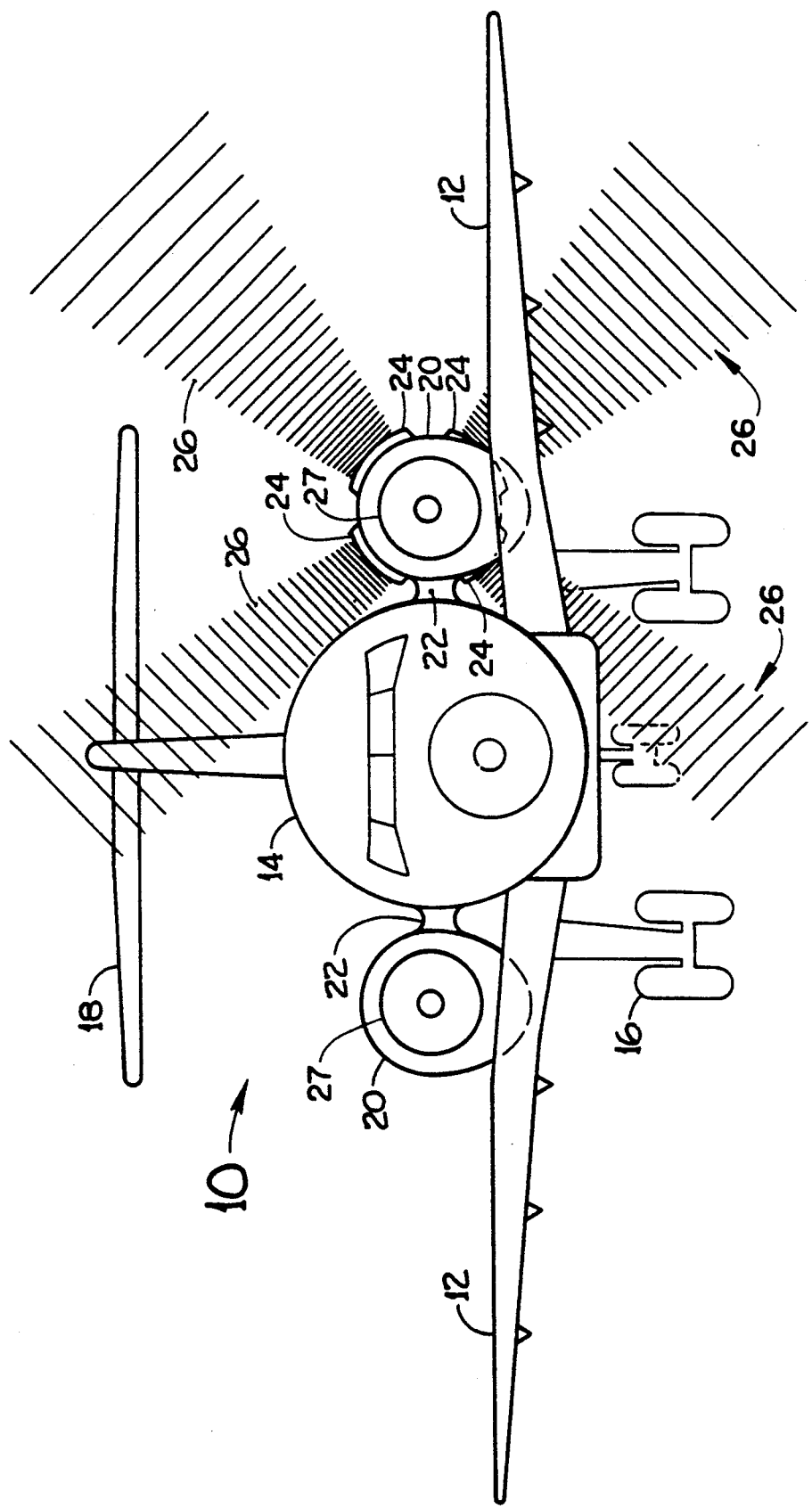
FIG. 1 is a schematic front elevation view of a typical aircraft having two fuselage mounted engines using the thrust reverser system of this invention.

Referring now to FIG. 1, there is seen a schematic view of a typical aircraft 10 having a conventional wing 12, fuselage 14, landing gear 16 and T-tail empennage 18. A pair of turbo-fan type turbine engines 20 are mounted on fuselage 14 by pylons 22, aft of wing 12 and near empennage 18. The left-hand engine 20 is shown configured with the thrust reverser system stowed and the right-hand engine 20 has the thrust reverser system deployed.

Four thrust reverser doors 24 are mounted in openings in each engine shroud. As indicated by shaded areas 26, reverse air flow can be tailored to avoid significant impingement on fuselage 14 or the runway in line with the landing gear 16, or engine inlet 27. In order to limit reverse air flow impingement on fuselage 14, where the engines are mounted on approximately the fuselage centerline, it is preferred that the openings and doors be located at approximately +45 degrees, −45 degrees, +135 degrees and −135 degrees to the vertical. These approximate angles will vary depending upon whether the engines are on, above or below a horizontal line through the fuselage center.

Air flow tailoring can be accomplished by modifying the size and shape of the inboard doors 24 or by the inclusion of selected strakes on the flow engaging surfaces of the inboard doors 24, as detailed below.

Figure 2:
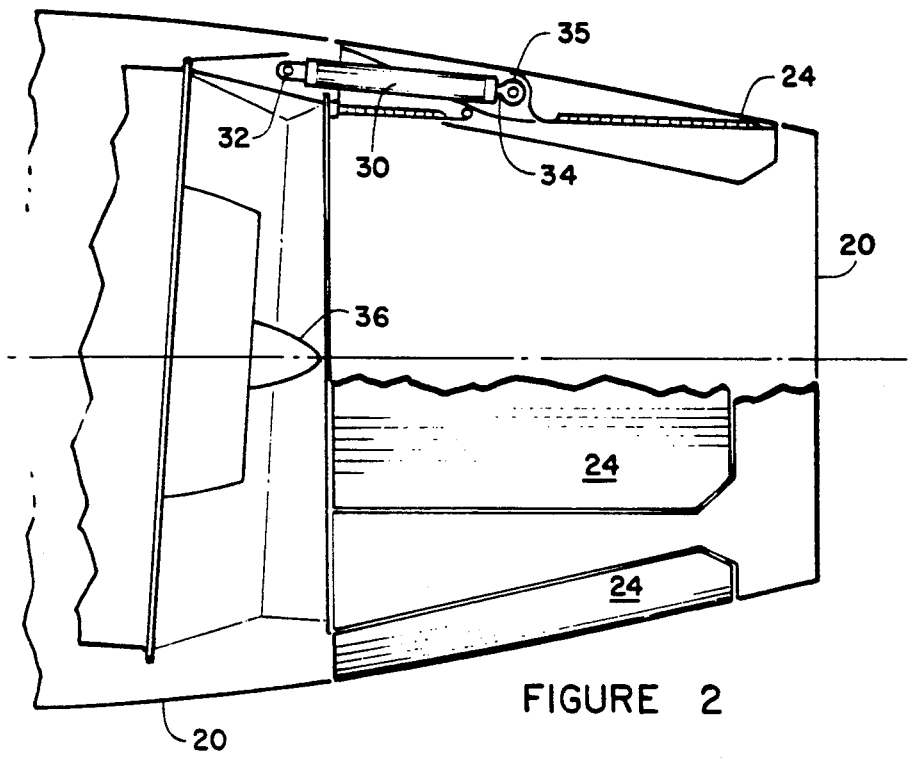
FIG. 2 is a schematic partially cut-away side elevation view of the thrust reverser system in the stowed position.
Figure 3:
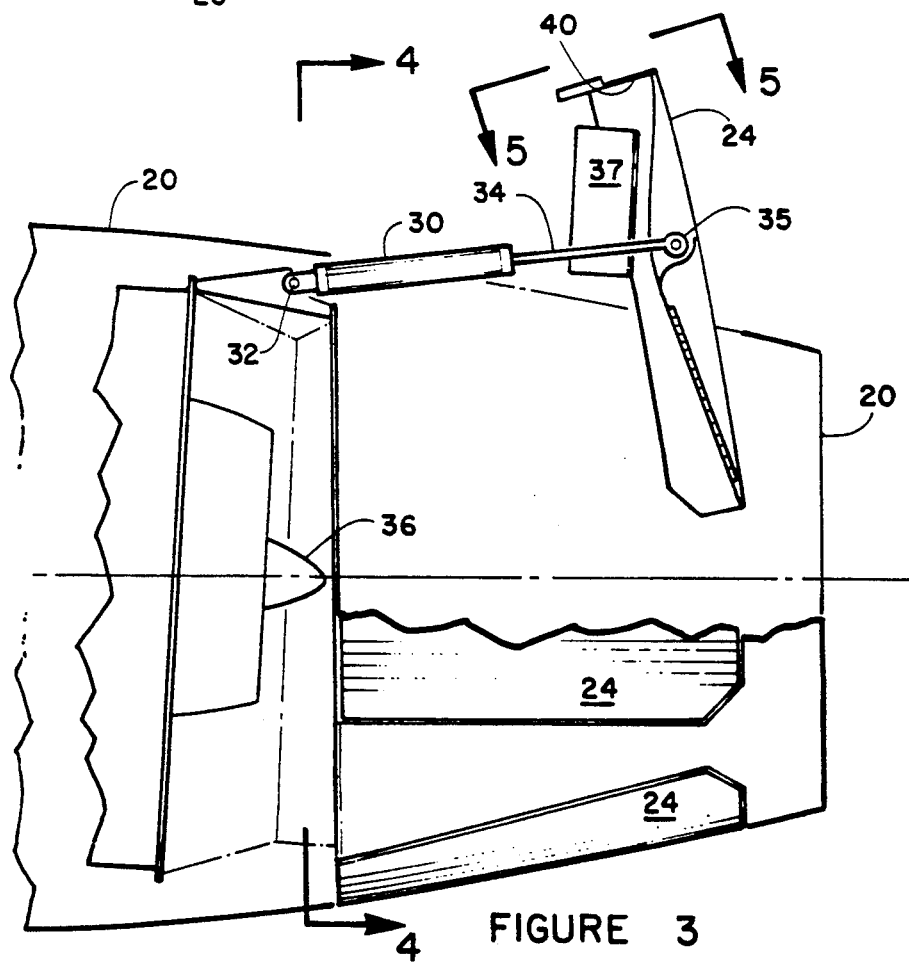
FIG. 3 is a schematic partially cut-away side elevation view of the thrust reverser system in the deployed position.

The location and operation of the doors 24 is schematically illustrated in FIGS. 2 and 3. In a conventional arrangement, the doors may be separated by longerons which house door pivot bearings, transfer reverse loads forward and support the shroud structure aft of the door openings. The longerons and structures forward and aft of the openings provide sealing surfaces for the stowed doors and prevent air leakage through the shroud during normal flight operations.

Doors 24 are shown in the stowed position in the lower half of the showing of FIGS. 2 and 3, with the upper portion cut-away to show the actuator 30. FIG. 2 shows upper door 24 and actuator 30 in the stowed position while FIG. 3 shows them in the deployed position.

Actuator 30 may be any suitable device such as a hydraulic cylinder or lead screw pivotably mounted on the engine nacelle at attachment point 32 with the extensible rod or screw 34 pivotably mounted to door 24 at attachment point 35. As rod or screw 34 extends, door 24 is moved from the position shown in FIG. 2 to that shown in FIG. 3. Door 24 rotates about conventional pivots (not shown) along the door sides. For clarity, the usual braces and reinforcements which would conventionally be used to stiffen and strengthen doors 24 are omitted.

Figure 4:
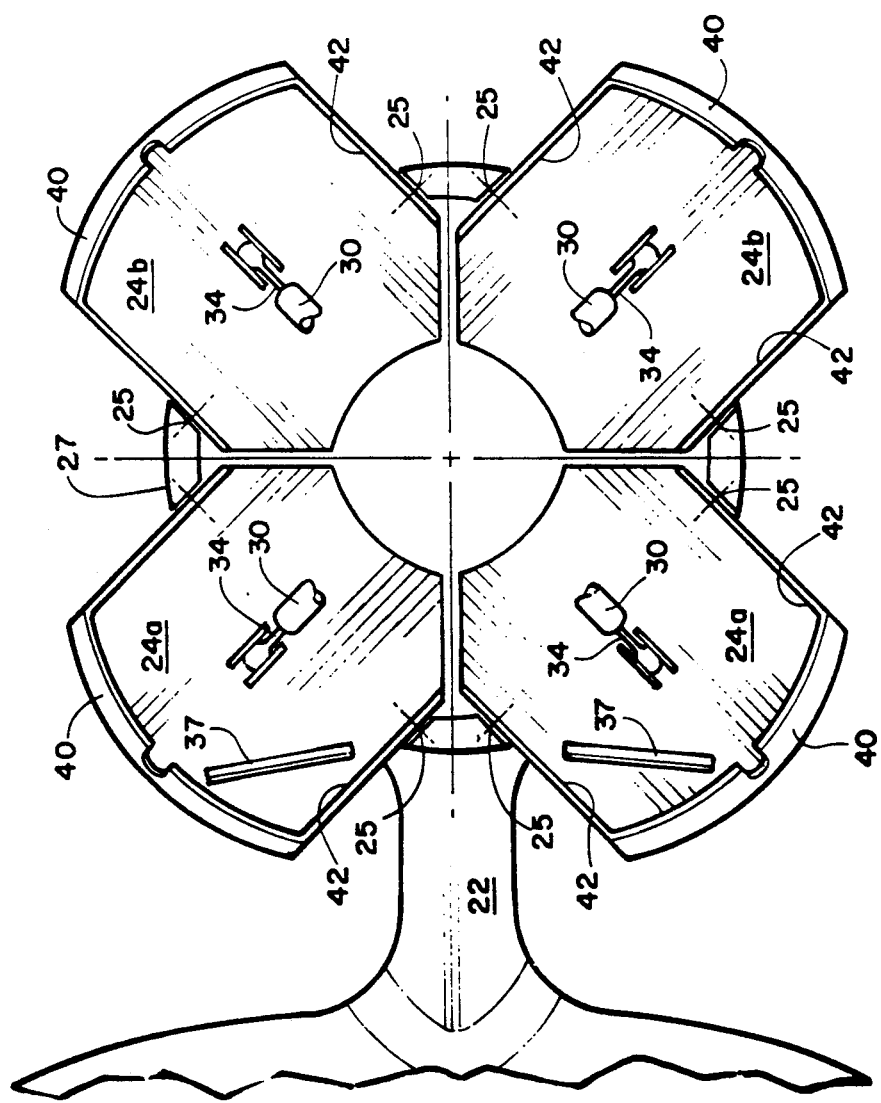
FIG. 4 is a schematic section view of the thrust reverser taken approximately on line 4—4 in FIG. 3.

FIG. 4 shows a schematic section view of a fully deployed array of doors 24, pivot 25 mounted to the reverser structure 27, taken approximately on line 4—4 in FIG. 3. The engine core 36 may be in contact with the fully deployed doors 24, or a selected space may be provided between doors and core. This area can be tailored for a particular engine.

In order to reduce impingement of reverse air flow on fuselage 14 as indicated by air flow patterns 26 in FIG. 1, the shape of the inboard doors (those adjacent to fuselage 14) may be modified, and/or folding strakes schematically indicated at 37 may be secured to the inboard doors at the positions appropriate to the specific engine mounting location and fuselage shape. Schematically represented strakes 37 may have any suitable shape, and may be located at any suitable position on the inner surface of the doors to provide the desired air flow tailoring. Strakes 37 are hinged along the door contacting edge so as to be foldable to a position against the inside surface of doors 24 when in the stowed position and deployable to the position shown. The srtakes 37 are approximately perpendicular to the door surface when the door is deployed. Any suitable strake deployment means, such as small conventional electrical or hydraulic actuators may be used, if desired. However, it is preferred for simplicity and light weight, that the strakes be spring-loaded toward the stowed position, with aerodynamic forces impinging on the strakes during door deployment moving the strakes to the deployed position when the thrust reverser is deployed.

Figure 5:
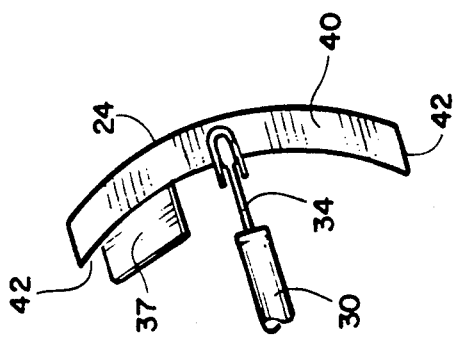
FIG. 5 is a schematic section view of the outer end of a door, taken on line 5—5 in FIG. 3.

Further details of doors 24 are shown in FIG. 5, which is an end view of a door taken on line 5—5 in FIG. 3. Each door incldes an end plate 40 and a pair of side plates 42. These plates extend in the direction of reverse air flow. They serve to both strengthen the door and to aid in directing air flow in the reverse (forwardly of the aircraft) direction. These plates can be shaped and have heights selected to direct reverse airflow away from fuselage 14 on the inboard doors. Any suitable basic door structure may be used. Typically, each door may include inner and outer skins, the inner skin including acoustic honeycomb layers. The doors may include any conventional longerons and frames as are desired to provide a structure capable of sustaining full reverse thrust loads. Conventionally, the thrust reverser deployment mechanism can be connected to engine power level control to prevent door deployment at high thrust levels. Ordinarily, the door will be deployed or stowed with the engine at idle, to prevent inadvertent thrust reversal and to assure that the strakes are stowed prior to door closure.

Figure 8:
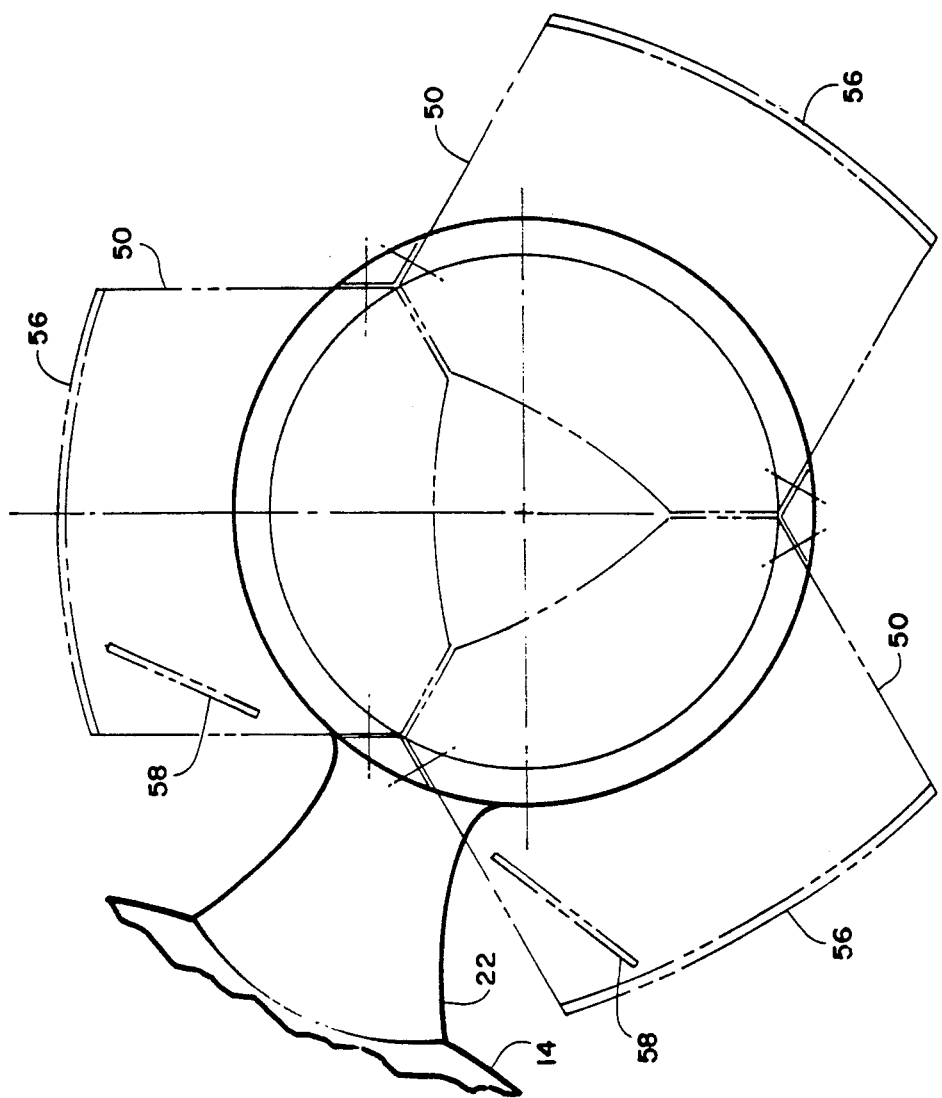
FIG. 8 is a schematic section view of the second embodiment, taken approximately on line 8—8 in FIG. 7.
Figure 7:
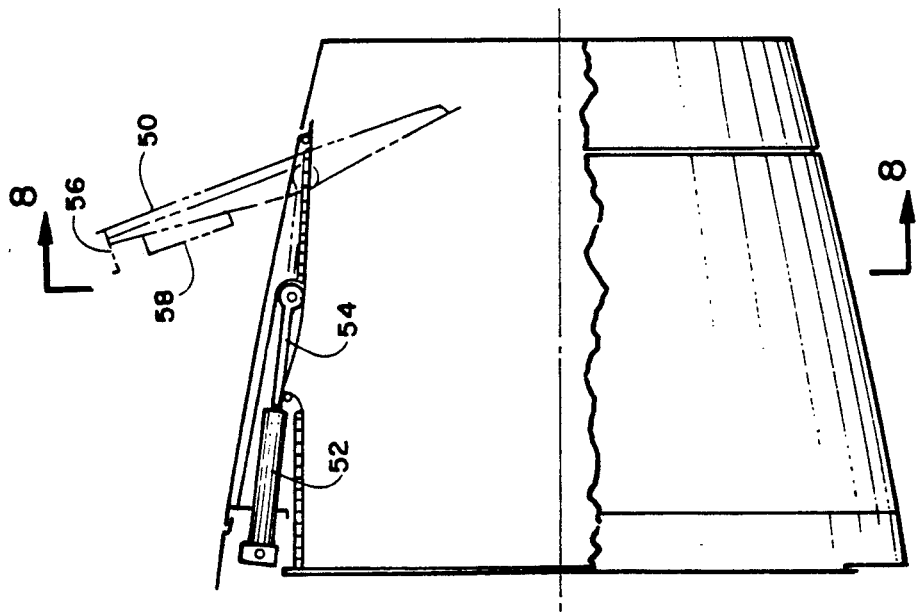
FIG. 7 is a schematic side view of the second embodiment, showing one thrust reverser door in the deployed position.
Figure 9:
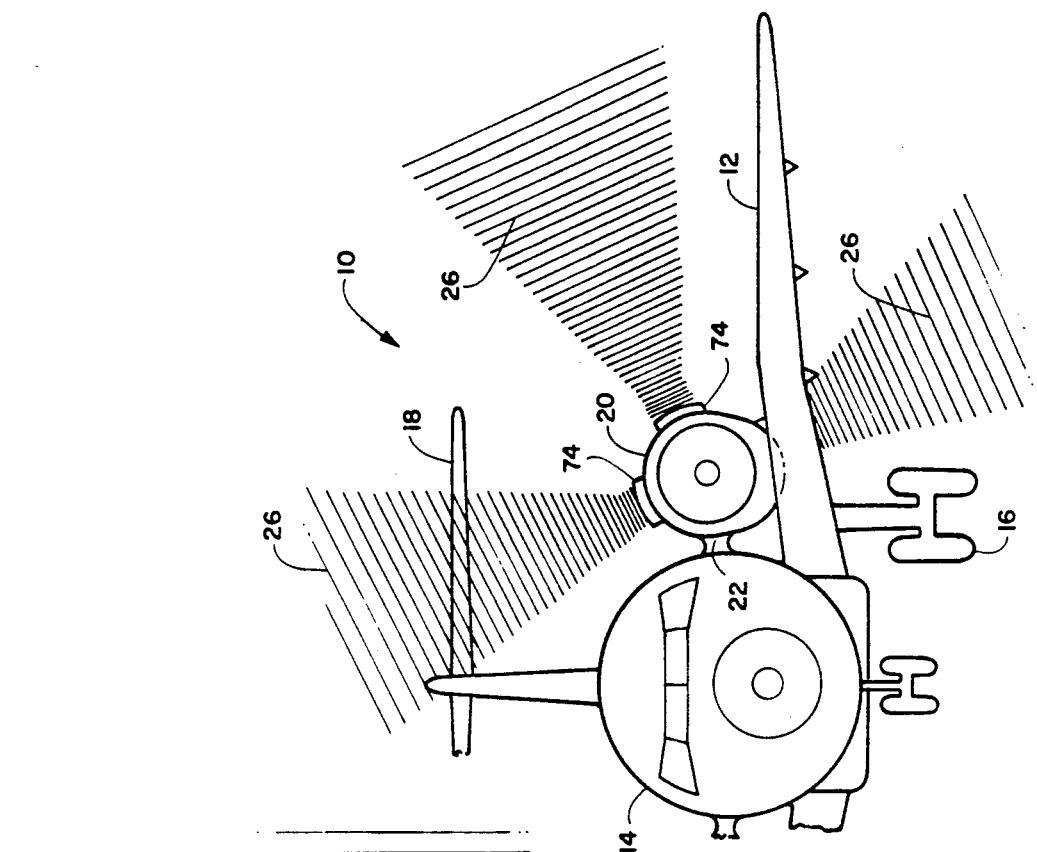
FIG. 9 is a schematic front elevation view of a third embodiment, showing only one half of a symmetrical aircraft.
Figure 6:
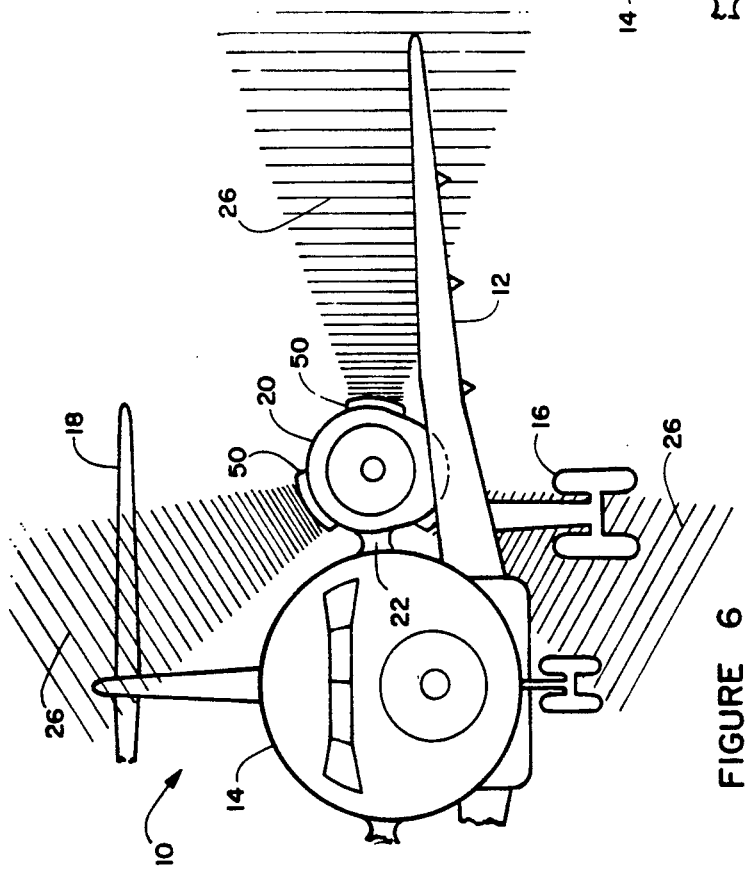
FIG. 6 is a schematic front elevation view of a second aircraft embodiment, showing only one half of a symmetrical aircraft.

A second embodiment of my thrust reverser system is illustrated in FIGS. 6-8. In this embodiment, aircraft 10 is generally similar to that shown in FIG. 1, with a wing 12, fuselage 14, landing gear 16, empennage 18 and a rear mounted engine supported by pylon 22 on the aft portion of the fuselage. Bands 26 represent the paths of reverse thrust air as deflected by doors 50 and strakes 58.

In this embodiment, three equally spaced thrust reverser doors 50 are provided, arranged so that reverse thrust air flow substantially avoids impingement on fuselage 14. Each door 50 is operated by an actuator 52, through an extensible rod 54. Each door 50 carries an end plate 56 and a deployable strake 58 configured and operable in the same manner as end plate 40 and strake 37 described above.

As seen in FIG. 8, doors 50 meet with a small opening remaining so that most, but not all, engine thrust is reversed. Line 60 represents a horizontal line in FIG. 6. While each door 50 must be larger and sturdier in this embodiment, the number of components is reduced and avoiding reverse thrust impingement on fuselage 14 is made somewhat simpler.

A third embodiment of my thrust reverser system is illustrated in FIGS. 9-12. In this third embodiment, aircraft 10 is generally similar to that shown in FIG. 1, with a wing 12, fuselage 14, landing gear 16, empennage 18 and a rear mounted engine supported by pylon 22 on the aft portion of the fuselage. Bands 26 represent the paths of reverse thrust air as deflected by doors 74 and strakes 72.

Figure 11:
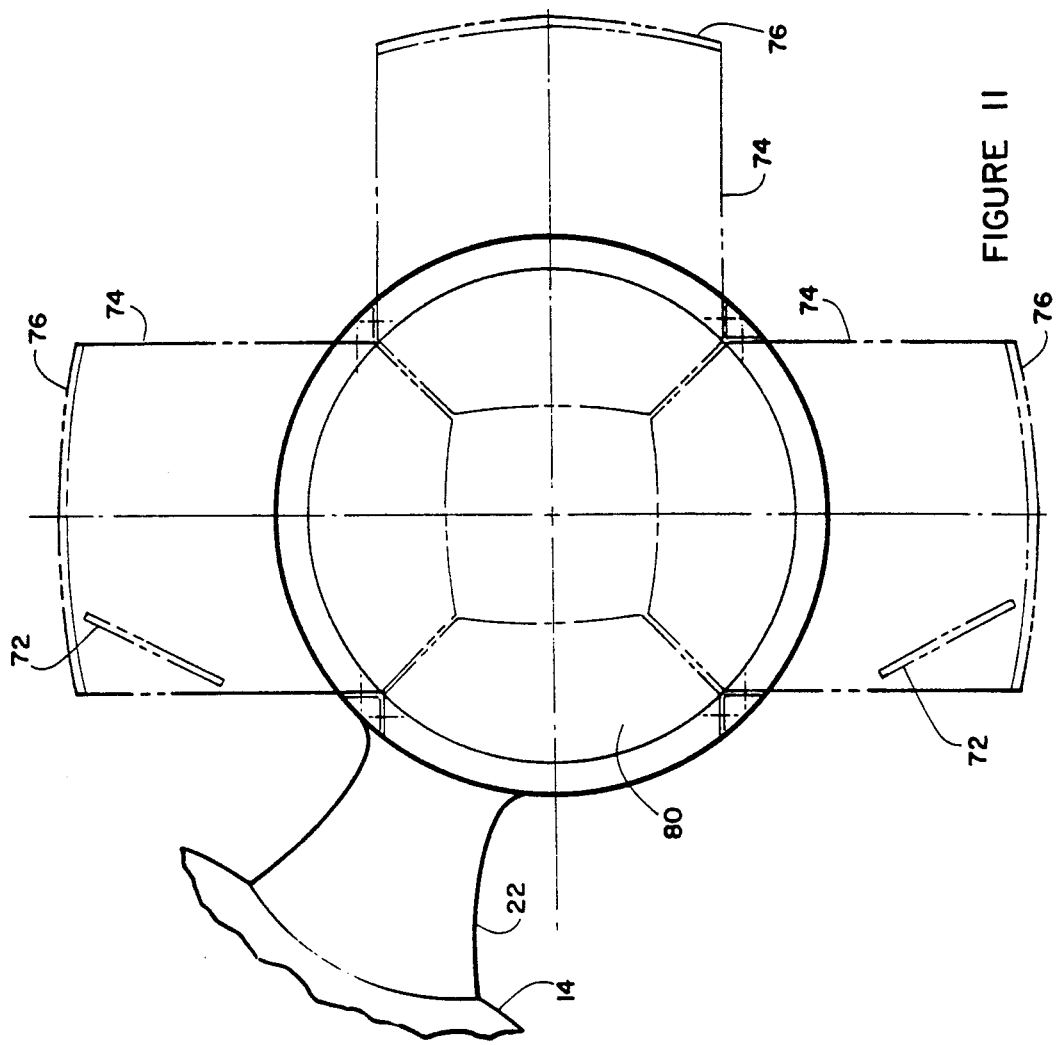
FIG. 11 is a schematic section view of the third embodiment, taken approximately on ling 11—11 in FIG. 10.
Figure 10:
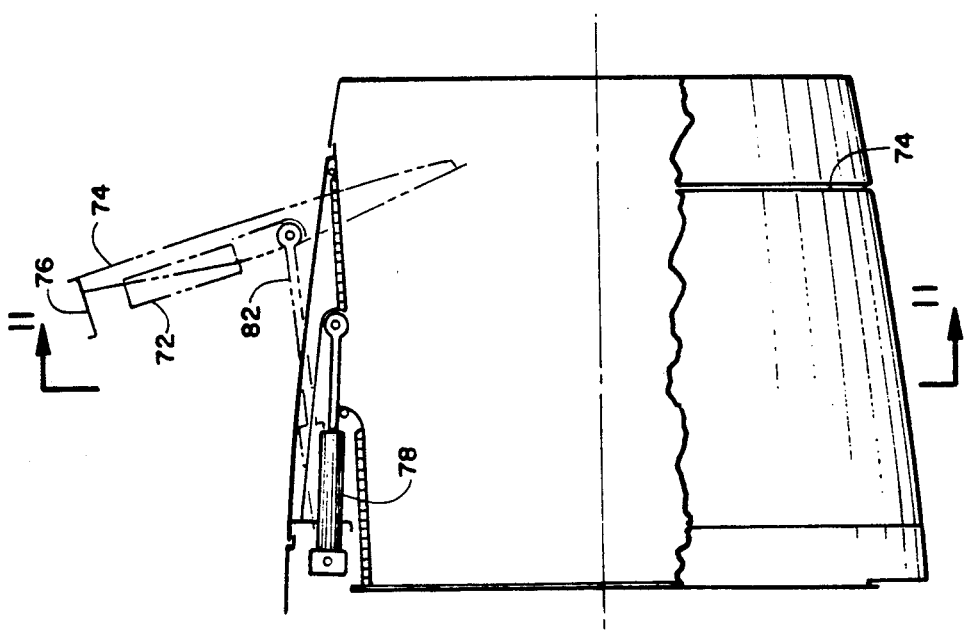
FIG. 10 is a partically cutaway side view of the third embodiment.
Figure 12:
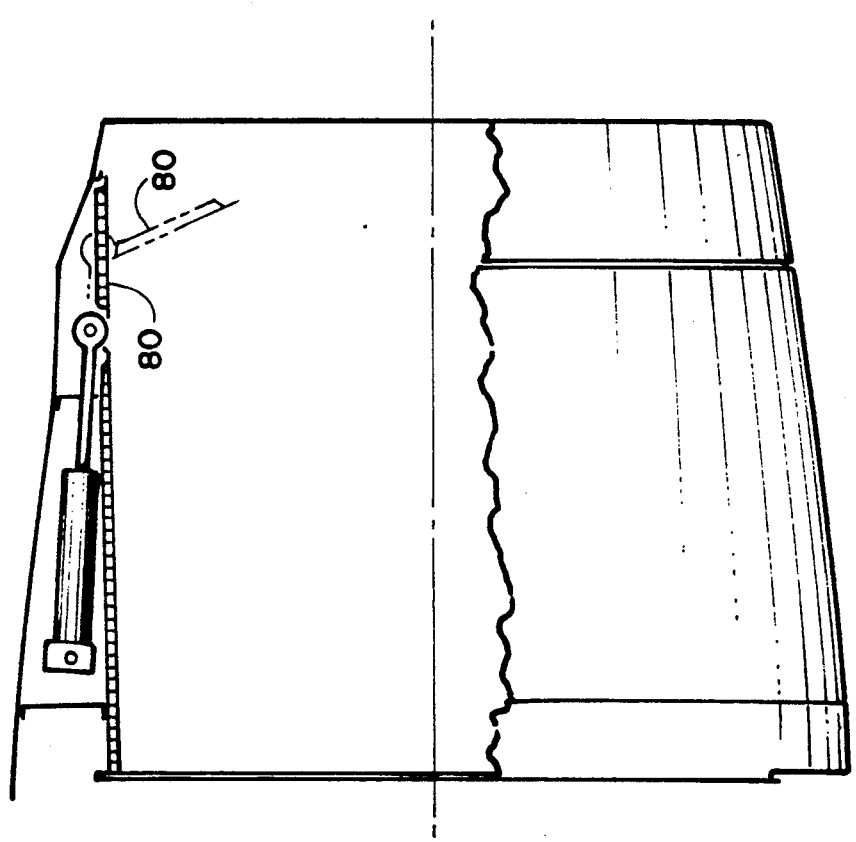
FIG. 12 is a detail section view of the blockage only door of the third embodiment.

As best seen in FIG. 11, in this third embodiment, three doors 74 are provided, with two extending upwardly and downwardly of the engine and the third outwardly of the fuselage direction. Each of these doors includes an actuator 78 and extensible rod 82 corresponding to actuator 30 and rod 34 and an endplate 76 corresponding to endplate 40 as described in conjunction with FIG. 5. The upper and lower doors 74 each includes a deployable strake 72 corresponding to strake 37 as shown in FIGS. 3-5 and described in detail above.

On the side of engine 20 toward fuselage 14 there is a "blockage only" door 80 which lies inside a closed outer engine skin and is movable by actuator 78 between a stowed position parallel to that skin and a deployed position extending into the air stream passing through the engine, as indicated in FIG. 11. In co-operation with doors 74, blockage only door 80 blocks a large portion of engine air flow and directs it out through the three openings left by doors 74 and is deflected forwardly and away from fuselage 14 by end plates 76 and deployable strakes 72.

Thus, the described thrust reverser system in each of the three described embodiments can be seen to be simple, light weight and highly effective for use with aircraft turbine engines, since reverse air flow paths can be tailored to avoid fuselage impingement for a variety of engine and aircraft configurations.

Certain specific components and configurations were detailed in the above description of preferred embodiments. Those can be varied, where suitable, with similar results.

I claim:

1. A thrust reverser system for use with aircraft turbine engines which comprise:

an engine shroud having a plurality of radially spaced openings therethrough, said openings having a forward and an aft end;

a plurality of reverser doors each of said plurality of reverser doors having an upstream and a down stream end and an inner door surface, said plurality of reverser doors rotatable between a stowed and a deployed position and adapted to close each opening when in said stowed position;

independent door actuator means for moving each of said doors between said stowed position and deployed position in which said upstream end of each door extends through the aft end of said opening, with the down stream end of each door partially blocked from about 50 to 80% of the air flow through said engine shroud and directing that air flow outwardly from said engine shroud through said opening and with the upstream door end projecting outside said shroud and further directing airflow exiting said opening in an outwardly and forwardly direction from said opening;

at least some of said doors including a strake mounted on the inside door surface said strake movable between a stowed position lying substantially against the inner door surface and a deployed position extending away from said inner door surface, whereby airflow along said inner door surface is guided in a selected direction.

2. The thrust reverser system according to claim 1 further comprising an aircraft fuselage wherein said engine is mounted by a pylon on said aircraft fuselage and said doors are arranged to avoid direct impingement of reverse air flow on the aircraft fuselage.

3. The thrust reverser system according to claim 2 wherein each of said strakes are mounted on doors adjacent to said fuselage and said strakes are positioned for directing reverse air flow in a direction reducing impingement of reverse air flow on said fuselage.

4. The thrust reverser system according to claim 3 including hinge means mounting each of said strakes on said doors and further including strake actuator means for moving each of said strakes between said stowed and deployed positions.

5. The thrust reverser system according to claim 4 wherein said strake actuator means includes spring means biasing said strakes toward said stowed position, said strakes being shaped to permit aerodynamic forces to move said strakes to the deployed position against said spring bias when reverse air flow is flowing across the inner surface of said door.

6. The thrust reverser system according to claim 1 wherein each of said doors includes an end plate and side plates all extending from the inner surface of the door in the direction of reverse flow, said plates being shaped and having heights selected to aid in directing reverse air flow away from nearby aircraft structures.

7. The thrust reverser system according to claim 2 wherein:

said engine shroud has four radically spaced openings with said openings located at about +45 degrees, −45 degrees, +135 degrees and −135 degrees to the vertical;

the corresponding four doors when fully deployed in aggregate diverting said from about 50 to 80 percent of the engine air flow through said openings;

each of said strakes being located on the two doors adjacent to said fuselage for directing reverse air flow in a direction reducing impingement of reverse air flow on said fuselage.

8. The thrust reverser system according to claim 2 wherein:
said engine shroud has three radially spaced openings;
the space between two adjacent doors is positioned toward said fuselage; and
said strakes are located on the two doors adjacent to said fuselage for directing reverse air flow in a direction reducing impingement of reverse air flow on said fuselage.

9. The thrust reverser system according to claim 2 wherein:
said engine shroud has three radially spaced openings, said openings spaced approximately 90°, 90° and 180° apart;
a blocker-only door located between the two more widely spaced openings, said blocker-only door being movable between a stowed position adjacent to the inner wall of the shroud when the reverser doors are stowed and a deployed position extending into said shroud to cooperate with said reverser doors in blocking a portion of airflow through said shroud and deflect that portion out through said three openings; and
said blocker-only door being oriented toward said fuselage.

10. A thrust reverser system for use with aircraft turbine engines mounted on the fuselage on an aircraft which comprises:
an engine shroud having four radially spaced openings with forward and aft ends;
said openings located at about +45 degrees, −45 degrees, +135 degrees and −135 degrees to the vertical;
plurality of doors having inner and outer surfaces movable between stowed and deployed positions adapted to close each opening when in the stowed position;
independent actuator means for moving each of said plurality of doors between said stowed position and said deployed position in which each door extends through said aft end of said opening, with the door at least partially blocking air flow through said shroud and further directing airflow exiting said opening in an outwardly and forwardly direction therefrom;
said doors when fully deployed in aggregate divert from about 50 to 80 percent of the engine flow out through said openings;
strakes on said doors adjacent to said fuselage for directing reverse air flow in a direction reducing impingement of reverse air flow on said fuselage; and
hinge means mounted said stakes on said doors and further including strake actuator means for folding said strakes when said doors are stowed and for deploying said strakes when said doors are deployed.

11. The thrust reverser system according to claim 10 wherein said strakes are mounted on doors adjacent to said fuselage and said strakes are positioned for directing reverse air flow in a direction reducing impingement of reverse air flow on said fuselage.

12. The thrust reverser system according to claim 10 wherein said strake actuator means includes spring means biasing said strakes toward said folded position, said strakes being shaped to permit aerodynamic forces to move said strakes to the deployed position against said spring bias when reverse air flow is flowing across the inner surface of said door.

13. The thrust reverser system according to claim 10 wherein each of said doors includes an end plate and side plates all extending from the inner surface of each of said doors in the direction of reverse flow, said plates being shaped and having heights selected to aid in direction of reverse air flow away from nearby aircraft structures.

14. A thrust reverser system for use with aircraft turbine engines mounted to an aircraft fuselage which comprises:
an engine shroud having three radially spaced openings having forward and aft ends;
the space between two adjacent openings being oriented toward said fuselage;
said openings being substantially equally spaced around said shroud;
a plurality of doors having an inner and outer surface, each of said doors having an upstream and a downstream end adapted to close each opening when in a stowed position;
independent door actuator means for moving each door between said stowed position and a deployed position in which each upstream door end projects outside said shroud and further directs from about 50 to 80% of the airflow exiting said opening in an outwardly and forwardly direction from said shroud;
at least some of said doors including a strake mounted on the inner door surface, said strake movable between a stowed position lying substantially against the inner door surface and a deployed position extending away from said inner door surface, whereby airflow along said inner door surface is guided in a selected direction.

15. The thrust reverser system according to claim 14 wherein said strakes are mounted on doors adjacent to said fuselage and said strakes are positioned for directing reverse air flow in a direction reducing impingement of reverse air flow on said fuselage.

16. The thrust reverser system according to claim 15 including hinge means mounting said strakes on said doors and further including strake actuator means for moving said strakes between said stowed and deployed positions.

17. The thrust reverser system according to claim 16 wherein said strake actuator means includes spring means biasing said strakes toward said stowed position, said strakes being shaped to permit aerodynamic forces to move said strakes to the deployed position against said spring bias when reverse air flow is flowing across the inner surface of said door.

18. The thrust reverser system according to claim 14 wherein each of said doors includes an end plate and side plates all extending from the inner surface of the door in the direction of reverse flow, said plates being shaped and having heights selected to aid in direction reverse air flow away from said nearby aircraft structures.

* * * * *